United States Patent
Baranyai

(10) Patent No.: US 10,421,480 B2
(45) Date of Patent: Sep. 24, 2019

(54) DUAL USAGE OF INDUCTOR CORE IN POWER SUPPLIES

(71) Applicants: THYSSENKRUPP PRESTA AG, Eschen (LI); thyssenkrupp AG, Essen (DE)

(72) Inventor: Zoltán Baranyai, Herceghalom (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 138 days.

(21) Appl. No.: 15/742,673

(22) PCT Filed: Jul. 8, 2015

(86) PCT No.: PCT/EP2015/065586
§ 371 (c)(1),
(2) Date: Jan. 8, 2018

(87) PCT Pub. No.: WO2017/005320
PCT Pub. Date: Jan. 12, 2017

(65) Prior Publication Data
US 2018/0201300 A1  Jul. 19, 2018

(51) Int. Cl.
*B62D 5/04* (2006.01)
*H01F 38/42* (2006.01)
*H01F 3/14* (2006.01)

(52) U.S. Cl.
CPC .......... *B62D 5/0403* (2013.01); *B62D 5/043* (2013.01); *B62D 5/046* (2013.01); *H01F 38/42* (2013.01); *H01F 3/14* (2013.01); *H01F 2038/426* (2013.01)

(58) Field of Classification Search
CPC . G05B 2219/37133; G05B 1/06; H02M 5/00; H02M 5/02; H02M 5/04;
(Continued)

(56) References Cited

U.S. PATENT DOCUMENTS

| 10,093,352 B2 * | 10/2018 | Mori | B62D 5/0484 |
| 2001/0024373 A1 * | 9/2001 | Cuk | H02M 1/44 363/16 |
| 2012/0146613 A1 | 6/2012 | Hamanaka | |

FOREIGN PATENT DOCUMENTS

| CN | 103419835 A | 12/2013 |
| CN | 104584423 A | 4/2015 |

(Continued)

OTHER PUBLICATIONS

English Translation of International Search Report issued in PCT/EP2015/065586, dated Feb. 24, 2016 (dated Mar. 2, 2016).

*Primary Examiner* — Antony M Paul
(74) *Attorney, Agent, or Firm* — ThyssenKrupp North America, Inc.

(57) ABSTRACT

An electromechanical motor vehicle power steering mechanism may include an electric motor and a control unit. The electric motor may be configured to provide a steering assist force. The control unit may be configured to control a current to the electric motor. Further, the control unit may include two redundant power supply units. Each of the two redundant power supply units may be connected to a vehicle battery. Also, the two power supply units may each comprise a primary winding and a secondary winding as part of a flyback transformer with a shared iron core. The shared magnetic core may be E-shaped with a middle leg and two side legs. The primary winding and the secondary winding of one of the two redundant power supply units may be wound around a first of the two side legs.

12 Claims, 1 Drawing Sheet

(58) Field of Classification Search
CPC ............ H02M 5/10; H02M 5/08; H02M 5/32; H02M 7/00; H02M 7/02; H02M 7/043; H02P 2201/07; H02P 2201/09; H02P 2201/11; H02P 1/00; H02P 1/16; H02P 1/18; H02P 1/24; H02P 1/26; H02P 1/42; H02P 1/46; H02P 1/465; H02P 3/24; H02P 3/08; H02P 6/008; H02P 7/00; H02P 7/292; H02P 11/00; H02P 11/04; H02P 13/00; H02P 13/10; H02P 25/04; H02P 23/00; H02P 27/00; H02P 27/04; H02P 27/06
USPC ........... 318/400.01, 700, 701, 727, 800, 658
See application file for complete search history.

(56) References Cited

FOREIGN PATENT DOCUMENTS

| | | |
|---|---|---|
| DE | 102009048091 A | 4/2011 |
| DE | 102010033440 A | 2/2012 |
| DE | 102010035149 A | 2/2012 |
| DE | 102010050818 A | 5/2012 |
| DE | 102013104358 A | 10/2014 |
| EP | 2450258 A | 5/2012 |
| WO | 2015063427 A | 5/2015 |

* cited by examiner

DUAL USAGE OF INDUCTOR CORE IN POWER SUPPLIES

CROSS REFERENCE TO RELATED APPLICATION

This application is a U.S. National Stage Entry of International Patent Application Serial Number PCT/EP2015/065586, filed Jul. 8, 2015, the entire contents of which are incorporated herein by reference.

FIELD

The present disclosure generally relates to electromechanical power steering mechanisms in motor vehicles.

BACKGROUND

In an electric power steering apparatus the steering assist force is applied to a steering mechanism by driving an electric motor in accordance with steering torque that is applied to a steering wheel by a driver.

Usually, the control of the electric motor is carried out using electronic components. Electronic components can fail abruptly. In this case the steering assist force is no longer present which is uncomfortable for the driver.

The published patent application DE 10 2010 050 818 A1 describes a fail-safe unit which supplies power to the motor even if one of two separate power supply units fails. The power supply units are completely independent from each other. A disadvantage of this solution is that a synchronisation unit is needed, which in the event of failure cannot guarantee power supply to the motor. Further, redundancy means undesired multiple component cost and board area.

Thus a need exists for an improved redundant power supply to an electric motor of an electric power steering apparatus, while keeping the number of components at a minimum to save cost and space.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims.

In addition, all references to one skilled in the art shall be understood to refer to one having ordinary skill in the art.

Accordingly, an electromechanical motor vehicle power steering mechanism with an electric motor providing a steering assist force and a control unit controlling the current to the electric motor are provided, whereas the control unit includes two redundant power supply units each connected to a vehicle battery, whereas the two power supply units each comprise a primary winding and a secondary winding as part of a flyback transformer with a shared magnetic core. By sharing the magnetic core of the flyback transformer cost and space can be reduced clearly.

It is also possible that the power supply units are connected to one common vehicle battery or each power supply unit are connected to separate vehicle batteries in order to provide power supply to the electric motor.

It is advantageous if the magnetic core has two air gaps forming two independent closed flux lines for each of the power supply units, so that the power supply units can act independently from each other.

In a preferred embodiment, the magnetic core of the transformer is e-shaped with a middle leg and two side legs, whereas the primary winding and the secondary winding of one power supply unit are wound around one side leg, respectively. Preferably, the two air gaps are formed between the two ends of the side legs and the middle leg. Thereby it is advantageous, if the middle leg is t-shaped.

It is preferred, that the electric motor is a permanently excited electric motor including at least three phase windings.

Favourably, the two power supply units each comprise of a flyback controller, a flyback driver circuit, a closed-loop controller, a closed-loop controller and a motor driver.

Figure 1:
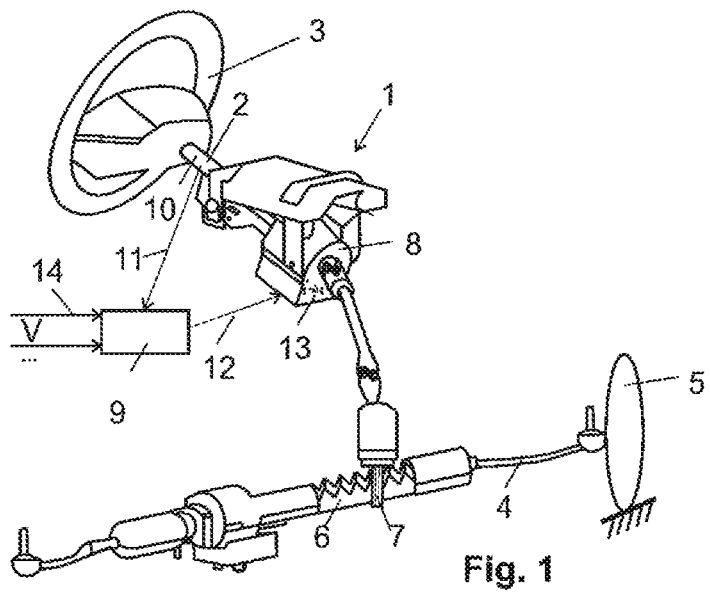
FIG. 1 is a schematic view of an example electromechanical power steering mechanism.

In FIG. 1 an electromechanical power steering mechanism 1 is schematically illustrated with a steering shaft 2 connected to a steering wheel 3 for operation by the driver. Steering rack rods 4 are connected in a known way to steered wheels 5 of the motor vehicle. A rotation of the steering shaft 2 causes an axial displacement of a steering rack 6 by means of a gear pinion 7 which is connected to the steering shaft 2 in a torque-proof manner. The electromechanical power steering mechanism 1 has a motor housing 8 on the steering column side. The motor housing 8 is connected to a control unit 9 which, amongst other things, receives torque signals form a torque sensor 10 via a signal line 11 and sends corresponding control signals via signal line 12 to the electric motor 13 arranged in the housing 8. The control unit 9 itself receives input signals such as the vehicle speed via a supply line 14. The electric motor 13 is a permanently excited synchronous motor.

Figure 2:
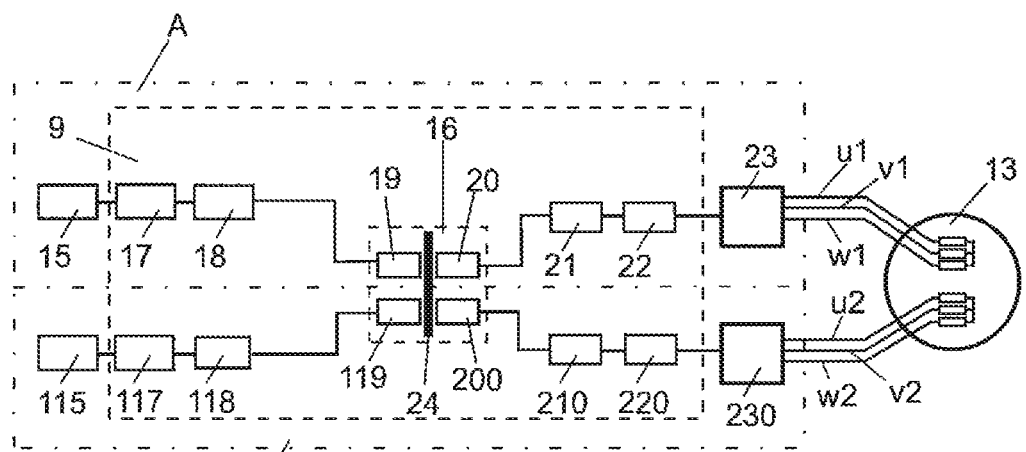
FIG. 2 is a circuit diagram of an example circuit for actuating redundantly a permanently excited synchronous motor with a single transformer coil.

The control unit 9 is illustrated in detail in FIG. 2. The control unit 9 includes two redundant power supply units A, B each connected to the vehicle battery 15, 115. Part of the two power supply units A, B is a flyback transformer 16. The power supply units A, B each comprise a flyback controller 17, 117, a flyback driver circuit 18, 118, a primary winding 19, 119 and a secondary winding 20, 200 of the flyback transformer 16, a closed-loop controller 21, 210, a closed-loop controller 22, 220 and a motor driver 23, 230 providing current to the phase windings u1, u2, v1, v2, w1, w2 of the electric motor 13. The flyback controller 17, 117 controls the flyback driver circuit 18, 118. It is also possible that the closed-loop controller 21, 210 and/or the closed-loop controller 22, 220 build up as open-loop controller.

At specific intervals set by the flyback controller 17, 117, the primary winding 19, 119 of the flyback transformer 16 is driven by the flyback driver circuit 18, 118 from the battery 15, 115. The primary inductance causes the current to build up in a ramp. When the DC supply of the primary winding 19, 119 is shut off, the current in the primary winding 19, 119 collapses leaving the energy stored in the magnetic core 24 of the flyback controller 17, 117 and the stored energy is transferred to the closed-loop controller 21, 210 via the secondary winding 20, 200 supplying the closed-loop controller 22, 220 with power. The flyback transformer 16 is preferably operated in discontinuous mode; the energy stored in the magnetic core 24, which is in the example a ferrite core but could also be an iron core, is completely emptied from the core 24 during the flyback period. The cycle is then repeated. The interval connecting the primary winding 19, 119 to the supply of direct current is determined from various measured signals e.g. input voltage, output voltage, primary current.

The redundant power supply units A, B share the ferrite core 24 of the flyback transformer 16. To make them independent, each part needs its own air gap, where the energy for the given part is stored. This way there is negligible influence and disturbance between the power supply units using the same core 24.

Figure 3:
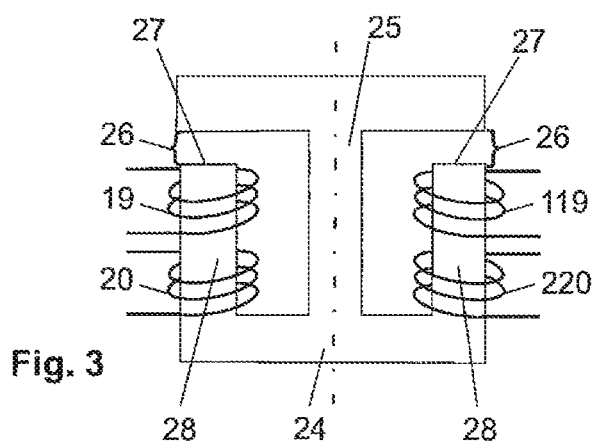
FIG. 3 is a schematic view of an example transformer coil from FIG. 2.

FIG. 3 shows a favoured flyback transformer 16. The flyback transformer 16 consists of a substantially e-shaped core 24, whereas the middle leg 25 is t-shaped forming small airgaps 26 between the ends 27 of the side legs 28 and the t-part 25. The primary winding 19, 119 and the secondary winding 20, 200 of a power supply unit A, B are wound around one side leg 28, respectively. Due to the design of the core 24, closed flux lines are produced in each half of the e-shaped core 24 without significant disturbance of each other allowing the core 24 to be used for the two supplies A, B.

In event of fault, determined by a flyback controller 17, 117, the respective flyback driver circuit 18, 118 is continuously deactivated. Power will continue to flow via the redundant functional and error-free flyback driver circuit 18, 118. The independence between the two power supply units A, B is given by the decoupled side legs 28 of the shared ferrite core 24, eliminating energy coupling between the two redundant power supply units A, B.

According to the invention, the energy density of a magnetic core is used for multiple parts of the circuitry. To make them independent, each part has its own air gap, where the energy for the given part is stored. This way there is negligible influence and disturbance between the circuits using the same core. The magnetic core is preferably shared by two power supply units each supplying energy to an own controller, which is controlling the motor drivers signals to the electric motor.

The power inductor in a power supply is both expensive and large. The most costly part is the ferrite material and one of the biggest parts is the ferrite core. By sharing the magnetic core between the redundant power supply units, cost and space can be saved.

The present invention is not dependent on the specific design of the steering mechanism or limited to the number of controllers and number of transformer windings.

What is claimed is:

1. An electromechanical motor vehicle power steering mechanism comprising:
    an electric motor that provides a steering assist force; and
    a control unit that controls a current to the electric motor, the control unit including two redundant power supply units, wherein each of the two redundant power supply units is connected to a vehicle battery, wherein each of the two redundant power supply units comprises a primary winding and a secondary winding as part of a flyback transformer with a shared magnetic core.

2. The electromechanical motor vehicle power steering mechanism of claim 1 wherein the shared magnetic core is E-shaped with a middle leg and two side legs, wherein the primary winding and the secondary winding of one of the two redundant power supply units are wound around a first of the two side legs.

3. The electromechanical motor vehicle power steering mechanism of claim 2 wherein the middle leg is T-shaped.

4. The electromechanical motor vehicle power steering mechanism of claim 1 wherein the shared magnetic core includes two air gaps forming two independent closed flux lines for each of the two redundant power supply units.

5. The electromechanical motor vehicle power steering mechanism of claim 4 wherein the shared magnetic core is E-shaped with a middle leg and two side legs, wherein the two air gaps are formed between two ends of the two side legs and the middle leg.

6. The electromechanical motor vehicle power steering mechanism of claim 5 wherein the middle leg is T-shaped.

7. The electromechanical motor vehicle power steering mechanism of claim 4 wherein the shared magnetic core is E-shaped with a middle leg and two side legs, wherein the primary winding and the secondary winding of one of the two redundant power supply units are wound around a first of the two side legs, wherein the two air gaps are formed between two ends of the two side legs and the middle leg.

8. The electromechanical motor vehicle power steering mechanism of claim 7 wherein the middle leg is T-shaped.

9. The electromechanical motor vehicle power steering mechanism of claim 7 wherein the electric motor is a permanently excited electric motor with at least three phase windings.

10. The electromechanical motor vehicle power steering mechanism of claim 1 wherein the electric motor is a permanently excited electric motor with at least three phase windings.

11. The electromechanical motor vehicle power steering mechanism of claim 1 wherein each of the two redundant power supply units comprises:
    a flyback controller;
    a flyback driver circuit;
    a first closed-loop controller; and
    a motor driver.

12. The electromechanical motor vehicle power steering mechanism of claim 11 wherein each of the two redundant power supply units further comprises a second closed-loop controller.

* * * * *